United States Patent
Widjaja et al.

(10) Patent No.: US 8,543,108 B2
(45) Date of Patent: Sep. 24, 2013

(54) METHOD FOR IMPROVED IDLE-MODE SIGNALING IN WIRELESS COMMUNICATION NETWORKS

(75) Inventors: Indra Widjaja, Roseland, NJ (US); Carl J. Nuzman, Union, NJ (US); Humberto J. La Roche, Ocean, NJ (US)

(73) Assignee: Alcatel Lucent, Paris (FR)

( * ) Notice: Subject to any disclaimer, the term of this patent is extended or adjusted under 35 U.S.C. 154(b) by 200 days.

(21) Appl. No.: 13/217,674

(22) Filed: Aug. 25, 2011

(65) Prior Publication Data

US 2013/0053031 A1 Feb. 28, 2013

(51) Int. Cl.
*H04W 4/00* (2009.01)
*H04W 72/00* (2009.01)
*H04W 68/00* (2009.01)
*H04W 36/00* (2009.01)
*H04B 7/00* (2006.01)

(52) U.S. Cl.
USPC ........ 455/435.1; 455/453; 455/515; 455/458; 455/426.1; 455/436; 455/442; 370/331

(58) Field of Classification Search
USPC .................. 455/453, 458, 426.1, 515, 435.1, 455/436, 442; 370/331
See application file for complete search history.

(56) References Cited

U.S. PATENT DOCUMENTS

| | | | |
|---|---|---|---|
| 2008/0220782 A1* | 9/2008 | Wang et al. | 455/436 |
| 2011/0312348 A1* | 12/2011 | Kulakov et al. | 455/458 |
| 2012/0252433 A1* | 10/2012 | Martin et al. | 455/422.1 |

FOREIGN PATENT DOCUMENTS

EP 1 276 342 A1 1/2003

OTHER PUBLICATIONS

Yuxuan Li et al, "Signaling Reduction for Inter-RAT Cell Reselection" 2010 2nd IEEE Intl Conf, Sep. 24, 2010, p. 428-432, XP0318181311.
Kuan D C M et al, "A Non-Linear Binary Integer Programming Model for Location ManagementDesign of GPRS", Intl Conf Seoul, KR May 16, 2005, p. 3100-3106, XP010825807.
Indra Widjaja et al, Modeling LTE/UMTS Deployment with Patchy Coverage:, 2010 IEEE 72nd, IEEE , Sep. 6, 2010, pp. 1-5, XP031770484.

\* cited by examiner

*Primary Examiner* — Vladimir Magloire
*Assistant Examiner* — Michael Mapa
(74) *Attorney, Agent, or Firm* — J. K. Jacobs (57) ABSTRACT

A method is provided for activation of Idle-mode Signaling Reduction (ISR) for a given mobile terminal based on behavior of the given mobile terminal, in a manner to minimize signaling load between the mobile terminals and the wireless network. The methodology operates to dynamically enable or disable ISR on a per-terminal basis, using the session arrival rate and timeout data for the mobile terminal. Based on these mobile-terminal behavioral criteria, and preferably using an iterative process at long time scales, the methodology operates to optimize the decision thresholds used to turn ISR on or off.

12 Claims, 7 Drawing Sheets

METHOD FOR IMPROVED IDLE-MODE SIGNALING IN WIRELESS COMMUNICATION NETWORKS

FIELD OF THE INVENTION

The present invention generally relates to idle-mode signaling in a wireless communications system.

BACKGROUND OF THE INVENTION

As wireless communication technology evolves toward 4th generation (4G) systems, many system operators are preparing to upgrade their wireless access networks from current 2G/3G technologies to such 4G systems, particularly systems operating under the Long-Term-Evolution (LTE) standards. The 4G systems provide a major advantage over 2G/3G systems in both capacity and throughput for handling data traffic, which is coming to dominate wireless communication applications. However, during initial deployment of a 4G system such as LTE, it is expected that the new technology will operate as an overlay with limited coverage in selected dense areas while the current technology (2G/3G) continues to operate as an underlay. User equipment (UE or mobile terminal) will be provided with multi-mode capability so that it can communicate through either technology seamlessly.

When the overlay has many coverage holes (i.e., subareas where only current-technology radio coverage is available in the subarea), UEs with even limited mobility experience frequent movement between overlay and underlay technologies, requiring re-registration at each transition from one to the other (characterized as "ping-ponging"), which in turn generates a high signaling load in the form of tracking area updates (TAUs). A mechanism, known as Idle-Mode Signaling Reduction (ISR) has been adopted in the 3rd Generation Partnership Project (3GPP) standards, which can significantly reduce the TAU signaling load by allowing the UE to register simultaneously with the underlay and overlay systems. The downside of ISR, however, is that each UE using ISR is paged on both the overlay system and the underlay system whenever a call arrives. This, of course, has the effect of significantly increasing the paging signaling load.

SUMMARY OF INVENTION

Because mobile terminals differ in traffic load and mobility behavior, some mobile terminals will have a lower signaling load with ISR enabled, and some will have a lower signaling load with ISR disabled. Using a protocol defined in the standards that allows ISR to be configured on a per mobile-terminal basis, the invention operates to apply ISR for a given mobile terminal based on behavior of the given mobile terminal, in a manner to minimize signaling load between the mobile terminals and the wireless network. Thus, the methodology of the invention operates to select the appropriate optimal configuration based on mobile terminal behavior.

In a desired application of the invention methodology, determination of the mobile-terminal behavior triggering enablement or disablement of ISR should be based on information readily available to the wireless network. To that end, the inventors have determined that the aspects of mobile terminal behavior that most significantly affect total signaling load are session arrival rate and timeout for periodic timer, and that the mobile-terminal velocity does not play a significant role. Accordingly, in an embodiment, the invention methodology operates to dynamically enable or disable ISR on a per-terminal basis, using the session arrival rate and timeout data, which are readily known to the network (unlike mobile-terminal velocity, which may be more difficult to obtain). Based on these mobile-terminal behavioral criteria, and preferably using an iterative process at long time scales, the invention methodology operates to optimize the decision thresholds used to turn ISR on or off.

BRIEF DESCRIPTION OF THE FIGURES

The teachings of the present invention can be readily understood by considering the following detailed description in conjunction with the accompanying drawings, in which.

DETAILED DESCRIPTION

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of a methodology for dynamically determining whether Idle-Mode Signaling Reduction should be applied for a given User Equipment, based generally on behavioral characteristics associated with the given UE. While the disclosed invention is illustratively described in terms of UEs operating in a wireless environment characterized by an LTE system overlay and a UMTS system underlay, it should be understood that the invention methodology is not so limited, and is intended to comprehend any wireless environment characterized by relatively frequent movement of a mobile terminal between two different radio technology systems.

When registered to a cellular network, a UE can be in connected mode or idle mode (or state) depending on whether it has a connection to the radio access network or not—the connected state generally being characterized as a Radio Resource Control (RRC) connection in UMTS and LTE systems. A UE is generally in idle mode most of the time except when it is actively transmitting or receiving data during a session. In idle mode, a UE operates in discontinues reception (DRX) cycles to conserve its battery usage by waking up periodically only when it needs to monitor its paging channel and system information briefly.

When an idle-mode UE moves from one cell to another within the same radio technology, it only needs to reselect a new cell to camp on without notifying the network as long as the new cell belongs to a currently assigned paging area (called tracking area (TA) in LTE systems and routing area (RA) in UMTS systems with data service). The advantage of such cell reselection is that it does not impose any signaling load on the network while the UE remains in idle mode.

When a UE moves outside of its currently assigned TA or RA, it has to switch to connected mode by establishing an RRC connection. It then notifies the network by performing a tracking area update (TAU) in LTE or a routing area update (RAU) in UMTS. Such updates (TAUs or RAUs) provide information from which the network can determine the approximate location of each idle-mode UE during periods when there is no connection between the network and the UE. This enables the network to broadcast paging messages to a selected TA/RA when a new network-originated session needs to be established. Generally, TA/RA updates, which are the only signaling event needed between an idle-mode UE and the network, occur much less frequently than cell reselections since the size of a TA/RA is significantly larger than the size of a cell area. (Typically, in well designed single radio-technology coverage areas, updates at average rates of 1-2 per UE per hour are observed during a busy period). Since those updates are considered non-revenue generating traffic to the system operator, it is in the operator's interest to keep update rates as low as possible.

Deployment of an overlay, however, can lead to patchy coverage for the overlay radio technology, with the presence of many coverage holes—i.e., areas where there is no coverage within a given geographical area for the overlay radio technology. Coverage holes can be due to overlay cell sites that are not deployed in a one-to-one fashion with underlay cell sites or other factors. It has been observed that TA/RA update rates can increase by a factor of 5-10 or even more per UE per hour for 2G-3G networks due to registration ping-ponging when the overlay is patchy. Such high update rates can reduce UE battery life-times, overload certain network elements and degrade network services.

As noted in the Background section, the 3GPP standard (Release 8) has defined a mechanism, called Idle-mode Signaling Reduction (ISR), which has a potential of reducing update rates due to registration ping-ponging. The basic idea of ISR is to allow a UE to register simultaneously in both the underlay technology, e.g., a UMTS RA, and the overlay technology, e.g., an LTE TA. When ISR is activated, an idle-mode UE moving back-and-forth between the currently registered RA and TA no longer needs to perform updates. However, since ISR activation requires the UE to register to both technologies simultaneously, paging messages will be broadcast to both RA and TA simultaneously.

Therefore, while ISR can effect a reduction in RA/TA update signaling load, that benefit needs to be weighed against the increased paging signaling load associated with ISR activation. Moreover, the reduction in RA/TA update signaling load from ISR activation varies considerably among the UEs in an RA/TA, but the art provides no basis for either evaluating that benefit on a per-UE basis, or for keying ISR activation to such an evaluation. The inventors have developed a methodology to provide ISR activation (or deactivation) for individual UEs which operates to not only prevent network elements from overloading, but also to minimize the signaling load on critical network elements such as the MME and the SGSN. That methodology is described hereafter.

Figure 1:
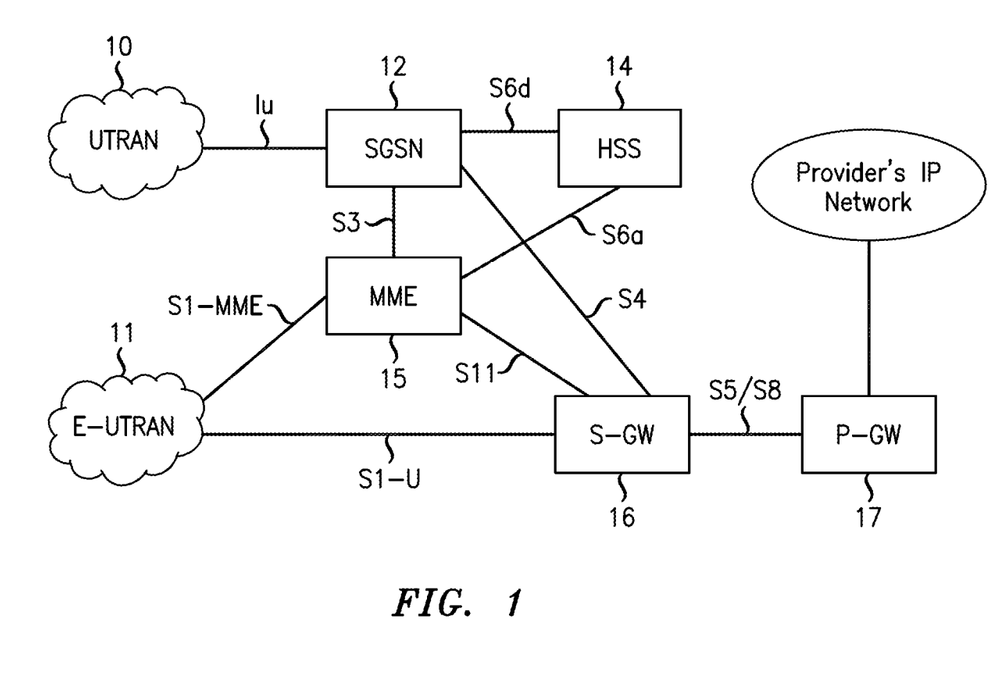
FIG. 1 provides a schematic depiction of a wireless system arrangement in which the method of the invention may be implemented.

FIG. 1 shows an illustrative architecture for an LTE overlay with a UMTS underlay. The core of the underlay system (generally indicated by its air interface reference, UTRAN 10) includes a Serving GPRS Support Node (SGSN) 12 that handles control-plane functions such as mobility management for UTRAN and security control. The SGSN also provides user-plane service and acts as a mobility anchor point if there is no direct tunnel between SGW and UTRAN.

The core of the overlay system (generally indicated by its air interface reference, E-UTRAN 11) has a Mobility Management Entity (MME) 15 that solely handles all control-plane functions for E-UTRAN including UE accessibility in idle mode, tracking area management, UE-MME signaling and bearer management. The overlay-system Serving Gateway (S-GW) 16 acts as a user-plane anchor point within a given access network as well as between access networks. The S-GW also performs downlink packet buffering for idle-mode UEs and initiates downlink-data notification to MME and/or SGSN to trigger paging. The Packet-data-network Gateway (P-GW) 17 provides access to the Internet and acts as an anchor point for different S-GWs.

Finally, the Home Subscriber Server (HSS) 14 contains information associated with each subscriber. Under this architecture, the bearer traffic between an active-mode UE and the S-GW can go via UTRAN or E-UTRAN. The indicated S1-U interface between an LTE base station (called eNodeB or eNB) in E-UTRAN and the S-GW is used when the UE communicates through E-UTRAN. The indicated S4 interface between the S-GW and the S-SGSN is used when the UE communicates through UTRAN, when there is no direct tunnel. For the direct tunnel case, an S12 interface (not shown in the figure) is used between the S-GW and UTRAN.

Figure 2:
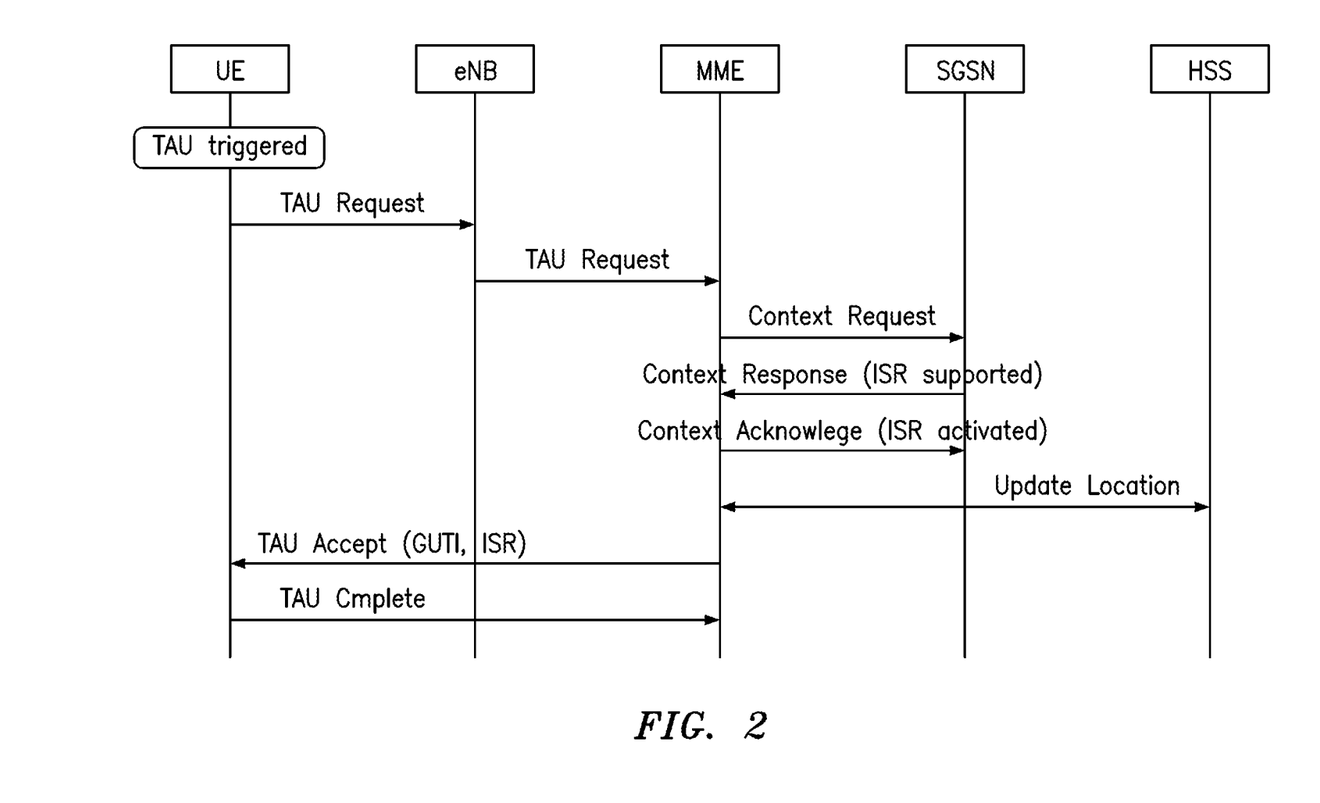
FIG. 2 provides a signaling diagram for ISR activation according to the method of the invention.

FIG. 2 provides a signaling diagram illustrating the process of ISR activation in the overlay-underlay network as shown in FIG. 1. It is assumed for purposes of the illustrated case that a UE is already registered in a UTRAN's RA and moves to an E-UTRAN's TA for the first time. Upon reselecting a new cell in E-UTRAN and detecting a new TA, the UE triggers a TAU request to an MME through a serving eNB. Based on the value of a temporary identity used in next update (called TIN) stored in the UE and included in the TAU request message, the MME can derive the address of the SGSN previously serving the UE.

During context transfer between MME and SGSN, ISR activation is also negotiated. If negotiation is successful (after the SGSN indicates that it supports ISR and MME activates it), the MME will update its registration for the UE to the HSS. The MME will also perform update for the bearer to the S-GW (not shown in the figure). Finally, the MME returns a TAU accept to the UE indicating that ISR has been activated. From this point, the UE will register in both the current TA and the current RA until the next update. With such double registration, no further updates are needed when the UE moves back-and-forth between the two technologies as long as the UE remains camped on a cell belonging to either of the currently registered TA or RA.

The UE and the network (at MME and SGSN) maintain similar periodic update timers for each technology. The UE needs to perform a periodic update when its corresponding periodic timer expires even if the UE does not cross a new TA or RA. If a UE cannot perform its periodic update (e.g., because it is camping on the UMTS underlay radio technology while its overlay LTE periodic timer expires), the UE deactivates its ISR status after a predetermined timeout. The network also implicitly deregisters the UE at the corresponding technology after the timeout. This allows the ISR status between the UE and the network to be consistent. When a UE performs an update because its periodic timer has expired, the network can choose to refresh the ISR status or to deactivate it. If the ISR status is refreshed, the corresponding periodic timers at the UE and the network are reset.

Consider now the signaling update rate due to UEs that move from one tracking area (TA) to another in an overlay and from underlay to overlay. It can be assumed for illustrative purposes that a UE always selects an overlay when it is available. Thus, a UE performs a TAU upon entering an overlay even though the underlay is also available. Assume that there are $C_O$ cells in the overlay of size $A_O$ km$^2$ and $C_A$ cells per tracking area. Suppose that there are $C_O/C_A$ equal-sized TAs in the overlay, each having a perimeter $L_A = L_C\sqrt{C_A}$ km, where $L_C$ is the perimeter of a cell. Using a fluid mobility model with average UE velocity of V km/hr, it can be shown that the average TAU rate per UE due to the overlay is given by $$R_O = (C_O/C_A)(VL_A)/(\pi A_O)$$

If the overlay has a perfect coverage (i.e., no coverage holes), then Ro will be the TAU rate per UE that MME needs to handle. However, when the overlay is patchy with many coverage holes as usually the case during early deployment, the TAU rate will be higher as the network has to perform a TAU when a UE with ISR deactivated crosses a coverage hole. To illustrate the point, it is assumed that the total area of coverage holes is a fraction of the overlay area and is denoted by $\alpha A_O$. If there are $N_H$ equal-sized holes each of size $A_H = \alpha A_O/N_H$, then each circular hole has a radius $r_H = \sqrt{\alpha A_O/(\pi N_H)}$ and perimeter length $L_H = 2\sqrt{\alpha \pi A_O/N_H}$. When ISR is deactivated, a UE has to perform a TAU upon leaving one of the coverage holes. The average TAU rate per UE due to $N_H$ coverage holes is given by $VL_H N_H/(\pi A_O)$, which can be written as $$R_H = 2V\sqrt{\alpha N_H/(\pi A_O)}$$

Observe that the TAU rate linearly depends on average UE velocity. When ISR is activated, a UE leaving a coverage hole does not perform any update assuming its periodic timer has not expired, which is typical when coverage holes are small and timer timeout is long. Thus, $R_H = 0$ when ISR is activated.

Figure 3:
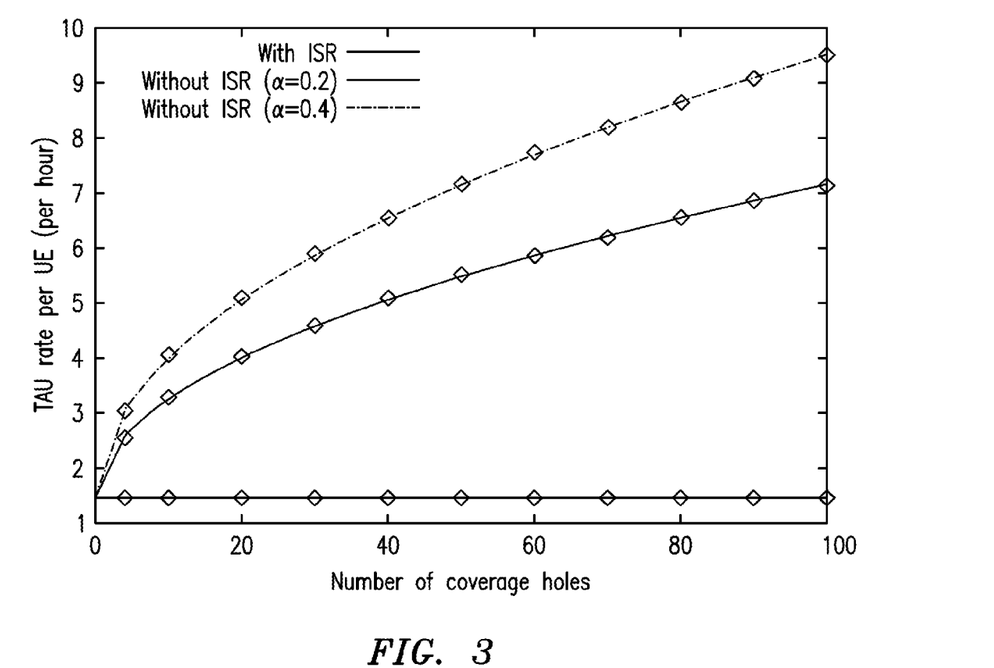
FIG. 3 illustrates generally the relationship between frequency of tracking area updates and the number of coverage holes in an overlay system.

FIG. 3 provides a comparison of the average TAU rates per UE with and without ISR activation. In the scenarios depicted in the figure, the parameter values are V=10 km/hr, T=3 hr, $L_C$=3.5 km, $C_A=C_O$=100. As can be seen, while the average TAU rate per UE with ISR is around 1.5, it increases as the overlay becomes more patchy ($N_H$ increases) without ISR. The analytical results are also validated by simulation shown as "◊" in the figure.

While ISR can reduce signaling update rate significantly when the overlay is patchy, as noted above, ISR also requires the network to maintain double registration. This has the potential of increasing paging rate and thus a tradeoff between updating and paging is needed. The focus here is on the MME processing load as it is the network element that handles signaling messages for both paging and updating. Since the paging process and the updating process generate different numbers of messages, message rate will be used as the metric for comparison.

Figure 4:
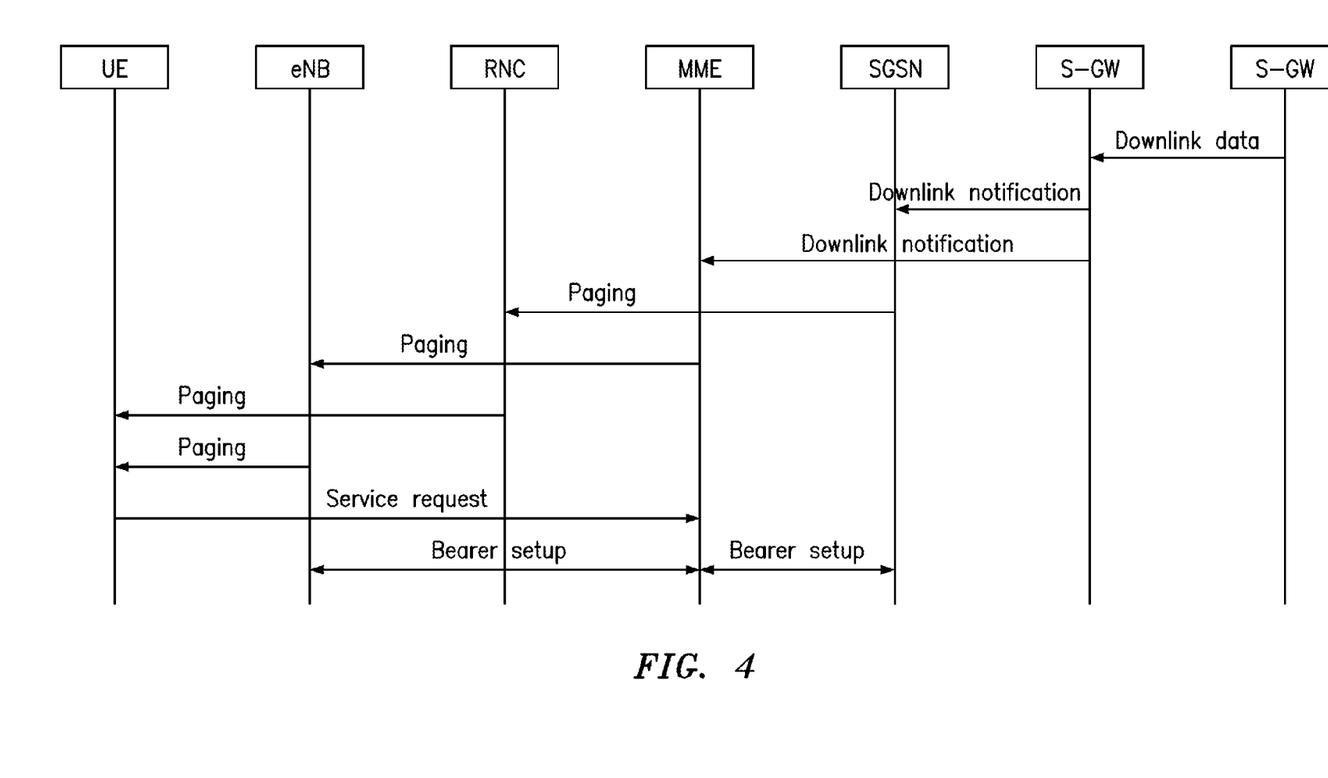
FIG. 4 generally depicts steps in the process of paging a UE.

FIG. 4 shows how paging messages are distributed by various network elements. As shown in the figure, paging is triggered when an S-GW receives the first downlink packet for an idle-mode UE. If ISR is not activated, the S-GW will send a notification message for paging to either the MME or SGSN depending on the technology to which the UE is registered. On the other hand, if ISR is activated (the case depicted in the figure), the UE is registered at both MME and SGSN. Thus, the S-GW will send the notification message to both the MME and SGSN. The MME will in turn distribute paging messages to all eNBs within an assigned TA. Similarly, the RNC of the underlay will also distribute paging messages to all UMTS base stations (NodeBs) within an assigned RA. If the UE is camping on a cell belonging to either TA or RA, the UE will eventually receive the paging message and can then initiate a service request to the corresponding technology. For example, if the UE is camping on E-UTRAN, the MME will receive a service request and then establish a bearer path for the new session between S-GW and UE through eNB. The UE will switch to connected mode until the session is completed and the bearer path is torn down.

Using the above constructs, one can now determine a break-even point where application or non-application of ISR yield the same message rate at the MME, and from that a basis for per-UE activation of ISR is developed.

Let $R^U$ be the average update message rate per UE at MME and $R^P$ be the average paging message rate per UE at MME. It is easily seen that, for the case where ISR is not activated, $R^U(\text{non-ISR}) \approx N^U(R_O + R_H)$, where $N^U$ is the number of messages per TAU at MME. On the other hand, with ISR activated, it should be readily apparent that $R^U(\text{ISR}) \approx N^U R_O$.

On the paging side, for the case of ISR not being activated, the paging message rate per UE at the MME will be $R^P(\text{non-ISR}) = N^P \lambda (1-\alpha)$, where $N^P$ is the number of messages per page at the MME and λ is the network-triggered session/call arrival rate per UE. Note, though, that the equivalent expression with ISR activated has lower and upper bounds. Specifically, the lower bound, which is found to be a better estimate than the upper bound, is given by $R^P(\text{ISR}) = N^P \lambda \max\{1-\alpha, VTH/A_O\}$, where T is the periodic timer update interval and H is the effective height of the overlay. If an overlay is a circle of radius R, the effective height is 2R. If an overlay is a square of side L, the effective height is $4L/\pi$. The equivalent result for upper bound can be expressed as $R^P(\text{ISR}) = N^P \lambda \max\{1+VTH/A_O\}$.

It is readily determinable that the upper and lower bounds become tighter as UE velocity, V, increases. Further, the bounds are observed to be close to each other when V is greater than or equal to 10-20 km/hr. Since ISR does not have appreciable impact at low UE velocity, one can use either of the bounds in practice. Note also that the bounds become tighter as the overlay becomes patchier (increasing in a or $N_H$).

The break-even point where ISR activation and non-application of ISR yield the same message rate at MME occurs when $R^U(\text{non-ISR}) + R^P(\text{non-ISR}) - R^U(\text{ISR}) - R^P(\text{ISR}) = 0$. Through well known algebraic manipulation, that equation can be solved for the paging-load break-even point, $\lambda_k$, that can used by the network to activate or deactivate ISR on a per-UE basis (UE(k)). That break-even point, $\lambda_k$, can be expressed as:

$$\lambda_k^* = 2(N^U/N^P)\sqrt{\alpha N_H/\pi}/T_k,$$

where $T_k$ is the timeout value of the periodic timer for the $k^{th}$ UE, UE(k).

As should be apparent, such a break-even parameter expressed in terms of paging load can be used by a system operator to accomplish the invention objective of only activating ISR for the UE when such activation can be expected to result in a net reduction of combined paging plus update loading for the MME. Accordingly, if the network-originated session arrival rate for UE(k), $\lambda_k$, is less than $\lambda_k^*$, then ISR should be activated for UE(k), and otherwise, ISR would not be activated for UE(k). This approach results in a minimal signaling load needed by each UE(k).

Note that the above equation verifies that the optimal value of $\lambda_k^*$ is independent of UE velocity V. Note also that this methodology for determining the break-even point allows $T_k$ to be different for different UEs. If, on the other hand, all UEs use the same default value of T, then $\lambda_k^*=\lambda^*$.

While the above equation provides the break-even point for deciding whether to activate ISR for a given UE in a closed-form formula, it is, in practice, difficult (if not impossible) to estimate the patchiness of an overlay. Furthermore, it may also be inconvenient to determine the values of $N^U$ and $N^P$. Note, however, that the quantities on the right hand side of the equation are all constants except for $T_k$. Thus, for an embodiment of the invention, an alternative method to determine the break-even point is given by $$\lambda_k^*=x/T_k,$$

where x is some unknown constant. If the constant x can be estimated, then $\lambda_k^*$ that minimizes the signaling load can obviously be found.

Figure 5:
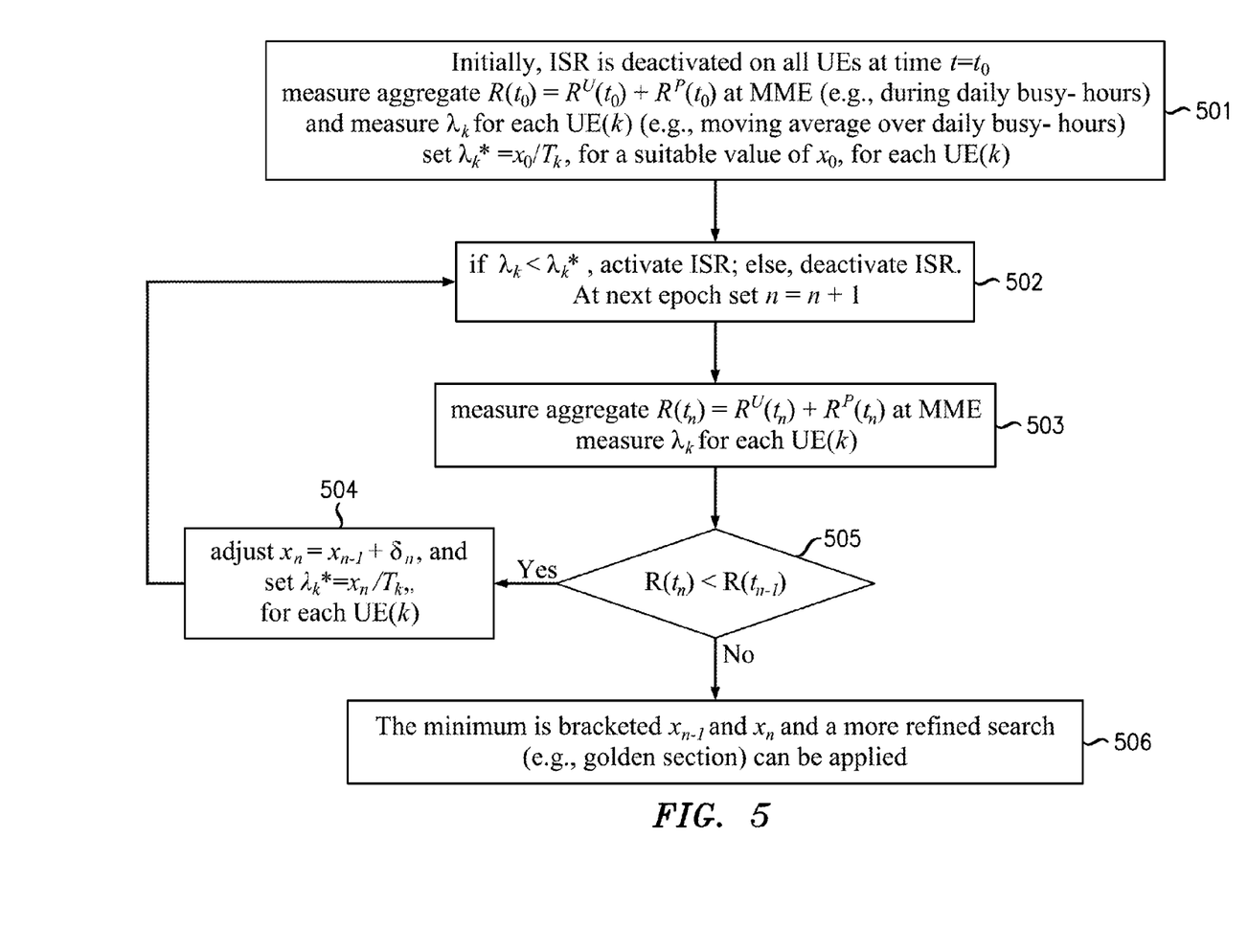
FIG. 5 provides a flow chart for a method of activating/deactivating ISR according to an embodiment of the invention.

A flow chart for determining $\lambda_k^*$ for each UE according to an embodiment of the invention is shown in FIG. 5. The method relies on measurements of two quantities: (1) aggregate paging and update rate and (2) network-originated session arrival rate. The flowchart shows the iterative nature of the process. As indicated in the figure, the process starts with ISR de-activated on all UEs at time $t=t_0$. In step 501, a measure is obtained of an aggregate average update message rate, $R^U(t)$, and average paging message rate, $R^P(t)$, ($R(t)=R^U(t)+R^P(t)$) at the MME over a time period (t, t+$\Delta$t) (for example, with $\Delta$t=30 minutes). In the same step, $\lambda_k$ is measured for each UE(k) over a longer-term duration (e.g., in-session arrival rate during busy periods). For example, $\lambda_k$ can be measured by means of an exponentially weighted moving average. An initial value of $\lambda_k^*$ is established as $x_0/T_k$ for each UE(k). In general, a small value of $x_0$ should be chosen so that it will not result in a large fraction of UEs being activated with ISR. The value should also not be too small such that only a few of UEs will be activated with ISR. An initial value of $x_0$ in the range 0.5 to 1 is reasonable. As an example, if $x_0$=0.5 and $T_k$=3 hours, then a UE with incoming session arrival rate greater than or equal to 0.1667 calls per hour will have its ISR activated.

In step 502, each of the $\lambda_k$ values determined in step 501, or step 503, is evaluated against the break-even parameter $\lambda_k^*$. Where given $\lambda_k$ values are less than the break-even value, ISR is activated for the corresponding UE(k). If the $\lambda_k$ value for that UE is equal to or greater than the break-even value, ISR is de-activated for that UE. After evaluation of all UE(k)s, the system waits until the next epoch at $t_{n+1}$. Illustratively, the incrementation unit could be daily and sample could be collected during busy hours in a given day. It should be understood, however, that the system operator may choose a different unit of incrementation, and all such units are intended to be within the scope of the invention.

In step 503 aggregate R(t) is again measured over the next sample period, along with updated measurement of session arrival rates $\lambda_k$ for each UE(k) over the same sample period. The value of R(t) measured in this step is then compared with the previously measured value of R(t) in step 505—the difference between the current and previously-measured R(t) values representing the change in MME loading from activation of ISR for selected UE(k)s in step 502.

If the new R(t) value is less than the previously measured R(t) value (prior to ISR activation for the selected UE(k)s) it is concluded that MME loading was improved (reduced) by the ISR activation of more UEs, but may be subject to further improvement with additional ISR activation. To the end the process moves to step 504, where the value of $x_n$ is increased by a predetermined increment, and a new value of the break-even parameter $\lambda_k^*$ is computed based on the new value of $x_n$. As a general rule, the increment by which the value of $x_n$ is increased should be selected so that an adequate percentage of UE(k)s (e.g., 5%) is selected to be switched from No-ISR to the ISR state.

At this point the process returns to step 502 to begin a new iteration. Thus, at step 502, each of the $\lambda_k$ values previously determined in step 503 is evaluated against the new break-even parameter $\lambda_k^*$ determined in step 504. Where given $\lambda_k$ values are less than the new break-even value, ISR is activated for the corresponding UE(k). In the event ISR was already activated for a particular UE(k), and the $\lambda_k$ value for that UE is equal to or greater than the break-even value, ISR is de-activated for that UE. The system then waits again for the next epoch and a new iteration begun.

Returning to step 505 for the case of the new R(t) value being greater than the previously measured R(t) value, and thus of the MME loading having increased with the prior ISR activation, it can be concluded that the value of the constant x, has increased beyond an optimal value, and that such an optimal value lies between the currently applied value of $x_n$ and that of the next preceding iteration of the process. At that point, the process may move to step 506 for a more refined local search over the range of values between the current value and that of the next preceding iteration for the value that comes closest to optimizing the MME loading. Alternatively, if the increment by which $x_n$ is adjusted only affects a small number of UEs (e.g., less than 3%), the invention process can stop as further improvement will be small and thus further optimization may not be worthwhile.

To summarize the methodology of this embodiment, the inventors have disclosed an iterative process for determining an ISR activation pattern that minimizes MME loading. At each iteration of the invention methodology, the ISR/non-ISR status for each UE is determined based on the value of an estimated paging-rate break-even loading parameter, $\lambda_k^*$, which is determined for that iteration. A new measurement of MME load and session arrival rates is made with each iteration. If improvement in MME load (i.e., lower signaling load) is made, the value of $\lambda_k^*$ is adjusted (through an incremental increase in the value of constant $x_n$) and another iteration is performed. When the MME load increases after adjustment of $x_n$, the minimum value is bracketed between the last two values of $x_n$. From this point, local search may be used to refine the optimal value of $\lambda_k^*$. Because of the stochastic nature of the MME load, the optimal value may be declared to have been found if improvement can only made within a small percent (say, less than 3%). After stabilization, periodic maintenance may be made on a longer interval (e.g., weekly or monthly) to track appreciable changes on arrival rates or other parameters such overlay patchiness.

In an alternative embodiment, the invention methodology proceeds as follows. First, a new variable, $\theta_k$, is defined as $\theta_k=\lambda_k T_k$. Then, from the prior definition of $\lambda_k^*$ ($\lambda_k^*=x/T_k$), it is clear that ISR should be activated for UE(k) if $\theta_k<x$, and deactivated otherwise. Further, a variable y=F(x) is defined as the fraction of UEs having $\theta$-values lower than x. The aggregate rate measured at the MME (paging and update rate) is then represented in terms of the inverse of y, $q(y)=F^{-1}(y)$ (which is known to exist since F is a monotonic function).

Thus the aggregate rate measured at the MME in time period $(t_n, t_n+\Delta t)$ is given by $R(q(y), t_n)$.

Figure 6:
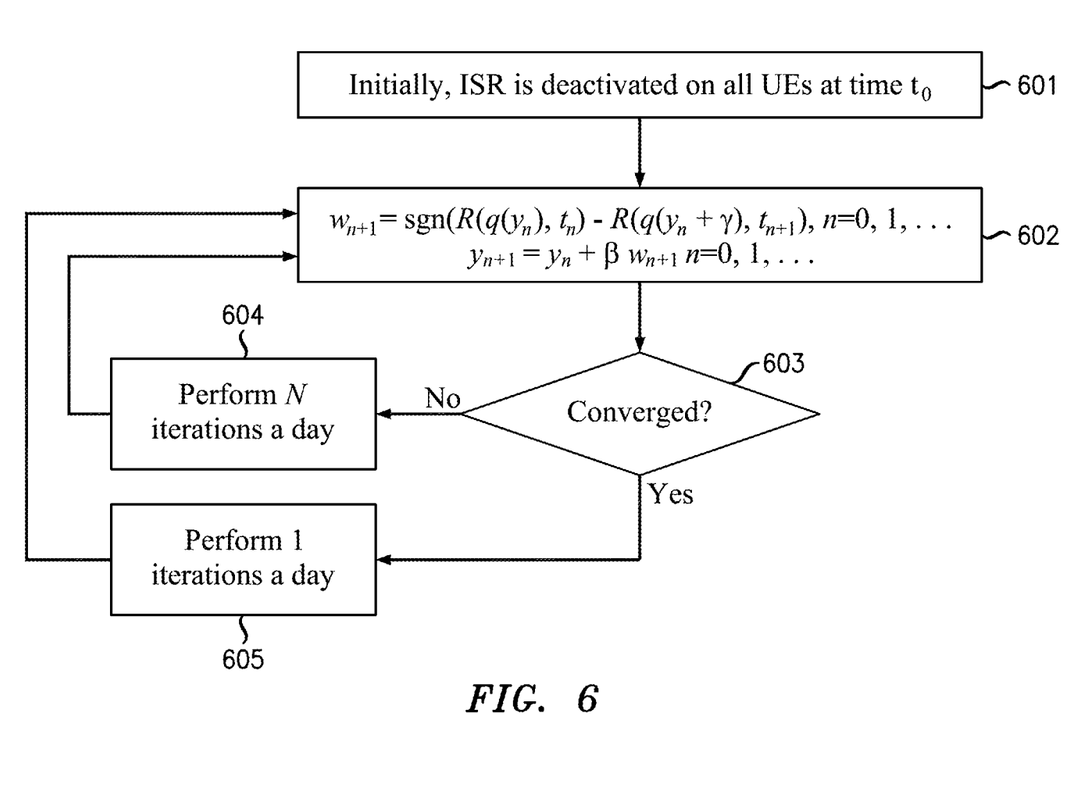
FIG. 6 provides a flow chart for a method of activating/deactivating ISR according to another embodiment of the invention.

The steps of this alternative embodiment, which provides a minimal aggregate rate at MME and can also automatically respond to changes in deployment (e.g., more cells deployed, better coverage, etc.) or UE behavior by means of periodic maintenance, are depicted in the flow chart of FIG. 6. In step 601, as with the prior embodiment, the system is initialized with ISR deactivated for all UEs.

In step 602, two measurement time periods in $(t_n, t_n+\Delta t)$ and $(t_{n+1}, t_{n+1}+\Delta t) = (t_n+\Delta t, t_n+2\Delta t)$ are used to estimate the aggregate rates at MME in these two periods. In the expression shown in Step 602 for the variable, $w_{n+1}$, the signum function "sgn" is defined by $sgn(z)=-1$ if $z<0$, $sgn(z)=0$ if $z=0$ and $sgn(z)=1$ if $z>0$ ["z" being a generic representation of the argument for the signum function]. Therefore $w_{n+1}=-1$ if the aggregate rate in time period $(t_n, t_n\alpha\Delta t)$ is less than that in time period $(t_n+\Delta t, t_n+2\Delta t)$. In other words, increasing the fraction of UEs with ISR activated will result in a higher aggregate rate at MME. As will be apparent, this result is contrary to the goal of minimizing the MME loading. On the other hand, if $w_{n+1}=1$, increasing the fraction of UEs with ISR activated results in lower aggregate rate at MME. Therefore, an algorithm for increasing or decreasing the fraction of UEs with ISR activated so that MME loading is minimized can be described by $y_{n+1}=y_n+\beta w_{n+1}$, $n=0, 1, \ldots$, as depicted in the figure. The parameter $\beta$ is a smoothing parameter. In an illustrative case, it might be set to approximately 0.05 (i.e., 5%). Larger values of $\beta$ allow the method to converge faster, while smaller values provide better results once convergence has been achieved. As is common in iterative control systems, one may also choose to begin with relatively large values of $\beta$, and later switch to smaller values.

In step 603, convergence can be detected by observing the successive values of $w_n$ and $w_{n+1}$. Generally, $w_n=w_{n+1}=1$ when successive iterations result in improvements in MME loading. However, when convergence is achieved, $w_n^*$ $w_{n+1}=-1$. These observations are used to detect convergence.

When convergence has not been achieved, step 604 is entered. This step keeps a counter to allow for up to N iterations of step 602 in a day to speed up convergence. For example, when the method is run during a busy-hour period (e.g., for 5 hours) and each iteration lasts for 30 minutes, then N is equal to 10 iterations per day. On the other hand, if step 605 is entered, periodic maintenance can be done by running step 602 once a day.

Figure 7:
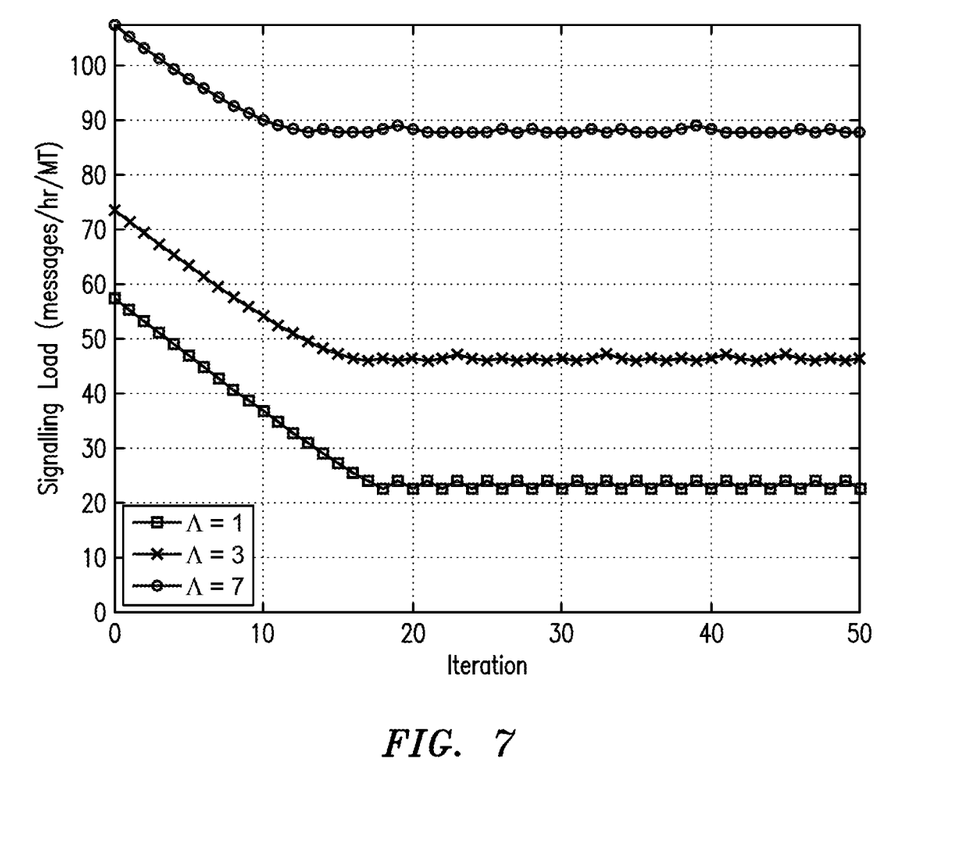
FIG. 7 shows a result of applying the methodology of the another embodiment of the invention.

FIG. 7 shows the result of the algorithm described for this embodiment, where $T_k=3$ hours for all UEs and A is the average paging load per UE per hour. The parameter values used by the algorithm are $\gamma=0.1$, $\beta=0.05$, $\Delta t=30$ minutes and $y_0=0$ (i.e., no ISR is activated initially). With these settings, it can be seen that the algorithm converges and remains close to optimal value within about 20 iterations. Due to typical diurnal load variations, the algorithm should typically be run during busy-period conditions (usually from late morning to late afternoon).

Other variations in the iterative methodology based on the relationship $\lambda_k=C/T_k$ will be apparent to those skilled in the art and are intended to be within the scope of the invention.

Finally, it is to be noted that the inventors have authored a paper entitled "Mitigating Signaling Overhead From Multi-Mode Mobile Terminals" [*In Prep, for publication in Proceedings of ITC* 2011] that is generally addressed to the idea of the invention here and which provides additional detail as to underlying theoretical/mathematical premises for some of the constructs described herein for developing the break-even point between update and paging rates for mobile terminals according to the invention. Although such underlying detail is purely of a background nature, and clearly is not needed for enablement of the disclosed invention, the inventors incorporate the text of that paper herein for whatever advantageous purpose it may serve.

Herein, the inventors have disclosed a system and method for activation/deactivation of Idle-mode Signaling Reduction for individual mobile terminals among a network of mobile terminals based solely on the session arrival rate for messages addressed to the mobile terminal and a timeout value for a periodic update timer maintained by ones of the mobile terminals. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. In a wireless communication system serving a plurality of mobile terminals wherein ones of the plurality of mobile terminals periodically signals to the wireless system a status change as the mobile terminal moves from a first serving area to a second serving area and further wherein ones of the mobile terminal periodically receive paging signals from the wireless system indicative of one or more messages available for transmission to the mobile terminal, a method for managing loading at one or more nodes of the wireless system comprising: determining a break-even point for a given one of the plurality of mobile terminals, the break-even point representing a balancing of a first loading effect based on status change signaling from the given mobile and a second loading effect based on paging signaling from the wireless system to the given mobile terminal, and being determined as a function of a timer value at the mobile terminal and arrival rate for messages arriving at the wireless system for transmission to the given mobile terminal; and causing the given mobile terminal to establish a registration with both the first and the second serving area when a message arrival rate for the given mobile is less than a break-even point message arrival rate.

2. The method of claim 1 wherein the break-even point is expressed in terms of a paging message arrival rate for the given mobile terminal.

3. The method of claim 1 wherein the registration with both the first and the second serving area is carried out according to an Idle-Mode Signaling Reduction (ISR) procedure.

4. The method of claim 3 further wherein:
the determining step includes:
measuring an aggregate system loading for the plurality of mobile terminals;
determining a trial break-even point for ones of the plurality of mobile terminals as a function of a given mobile-terminal's timer value and an unknown constant value, based on an estimate of the constant value;
evaluating the message arrival rate for the given mobile terminal against the trial break-even point for the given mobile terminal;
repeating the evaluation step for each of the plurality of mobile terminals; and the causing step includes:

applying the ISR procedure for ones of the plurality of mobile terminals having a message arrival rate less than its trial break-even point.

5. The method of claim 4 further including:

determining a change in aggregate system loading for the plurality of mobile terminals based on the applying of the ISR procedure in the applying step;

if the determined change in aggregate system loading indicates a reduction in system loading, adjusting the estimated constant value to a new value;

determining a new trial break-even point for ones of the plurality of mobile terminals as a function of a given mobile-terminal's timer value and the new constant value;

reevaluating the message arrival rate for the given mobile terminal against the new trial break-even point for the given mobile terminal;

repeating the reevaluation step for each of the plurality of mobile terminals.

applying the ISR procedure for additional ones of the plurality of mobile terminals determined in the reevaluating and repeating steps to have a message arrival rate less than its new trial break-even point.

6. The method of claim 5 further including:

determining a change in aggregate system loading for the plurality of mobile terminals based on the applying of the ISR procedure in the step of applying the ISR procedure for additional ones;

if the determined change in aggregate system loading indicates a further reduction in system loading, repeating the steps of (1) adjusting the estimated constant value, (2) determining a new trial break-even point, (3) reevaluating message arrival rate against new trial break-even point, (4) repeating reevaluation for each of plurality of mobile terminals and (5) applying ISR procedure for additional ones of plurality of mobile terminals having message arrival rate less than its new trial break-even point.

7. The method of claim 6 wherein the determining step and the step of repeating prior claim steps (1)-(5) are iteratively repeated until the resultant change in aggregate system loading is equal to or less than a predetermined level.

8. The method of claim 6 wherein the determining step and the step of repeating prior claim steps (1)-(5) are iteratively repeated until the number of mobile terminals caused to switch from a non-ISR state to an ISR state in the immediately preceding step of applying ISR procedure is reduced to a predetermined limit.

9. The method of claim 8 wherein the predetermined limit is constituted as a range of values, and any value within the range is accepted as a basis for terminating the repeating process.

10. The method of claim 8 wherein the predetermined limit determined to be reached when the change from non-ISR to ISR state occurs for less than about 3% of the number of mobile terminals in the plurality of mobile terminals.

11. The method of claim 2 wherein the break-even point is determined according to the relationship:

$$\lambda_k = C/T_k$$

where $\lambda_k$ represents the message-arrival-rate break-even point for the $k^{th}$ mobile terminal, C is an unknown constant, and $T_k$ represents the timing duration of a periodic timer operated at the $k^{th}$ mobile terminal, and where an estimated value of C is applied for determining a trial value of $\lambda_k$.

12. The method of claim 11 wherein an initial estimated value of the constant C is "1".

* * * * *